United States Patent [19]

Langhorst et al.

[11] 4,113,471

[45] Sep. 12, 1978

[54] EXTRACTION OF NON-FERROUS METAL VALUES FROM DOLOMITIC OXIDE ORES

[75] Inventors: Martin A. Langhorst; Gerard C. Sinke, both of Midland; Elmer H. Mossner, Saginaw, all of Mich.

[73] Assignee: The Dow Chemical Company, Midland, Mich.

[21] Appl. No.: 746,981

[22] Filed: Dec. 2, 1976

[51] Int. Cl.$^2$ .............................................. C22B 3/00
[52] U.S. Cl. ................................. 75/101 R; 75/114; 75/117; 75/118 R; 75/119; 75/120; 75/121; 75/109; 423/39; 423/98; 423/53; 423/109; 423/150; 423/155; 204/107; 204/111; 204/113; 204/117; 204/119; 204/105 R
[58] Field of Search ................ 423/38, 39, 46, 98, 423/109, 104, 139, 150, 155; 75/101 R, 111, 114, 109, 117, 118, 119, 120, 121; 204/117, 105, 107, 111, 113, 119

[56] References Cited

U.S. PATENT DOCUMENTS

| | | | |
|---|---|---|---|
| 496,951 | 5/1893 | Parkes | 75/114 |
| 664,269 | 12/1900 | Hoepfner | 75/120 |
| 846,492 | 3/1907 | MacIvor | 423/150 |
| 889,129 | 5/1908 | Hendryx | 423/40 |
| 915,705 | 3/1909 | Seigle | 75/114 |
| 1,032,400 | 7/1912 | Gunther | 75/101 R |
| 1,390,603 | 12/1921 | Christensen | 204/117 |
| 1,489,008 | 4/1924 | Richards | 423/173 |
| 1,539,712 | 5/1925 | Christensen | 75/114 |
| 4,011,146 | 3/1977 | Coltrinari | 423/39 |

*Primary Examiner*—Brian Hearn
*Attorney, Agent, or Firm*—J. M. Kuszaj

[57] ABSTRACT

A process for extracting non-ferrous metal values from an oxide ore. The process comprises leaching the ore with a solution containing at least one alkali metal chloride or alkaline earth chloride salt in the presence of an oxygen-containing gas at a temperature and pressure sufficient to solubilize the non-ferrous metal values into the solution of the metal chloride salt.

11 Claims, No Drawings

EXTRACTION OF NON-FERROUS METAL VALUES FROM DOLOMITIC OXIDE ORES

BACKGROUND AND FIELD OF THE INVENTION

The present invention relates generally to a process for extracting metal values from ores, and more specifically, to a process for extracting non-ferrous metal values from oxide ores.

Many types of geological ore deposits are known which contain naturally occurring aggregate or combination of minerals from which one or more non-ferrous metals such as silver, copper, lead, zinc, gold, nickel, magnesium, or chromium can be extracted. From a metallurgical standpoint, a few of the naturally occurring ores contain non-ferrous metals in their metallic or native state. However, the great majority of ores contain non-ferrous metals in combination with other elements. The most common types of the latter ores are (a) oxide ores which can include oxides, carbonates and silicates of the non-ferrous metals, and (b) sulfide ores which can include sulfides, selenides, tellurides, arsenides, and/or antimonides of the non-ferrous metals. (J. L. Bray, "Non-Ferrous Production Metallurgy", John Wiley & Sons, New York, N. Y., 1947, pp 19-20).

Conventionally, ores in which the non-ferrous metal values are in the form of the sulfides have been extensively mined due to the ready availability of these ores and the relatively large proportion of the non-ferrous metals which may be economically recovered from the sulfide ores. However, these high-grade sulfide containing mineral ores are rapidly being depleted, and industry is being forced to consider other classes of ores, wherein the metal content may not be as readily recoverable as the sulfide type ores.

One area of particular metallurgical interest is ores of the oxide type, some of which are believed to contain appreciable percentages of valuable non-ferrous metal values in various forms. Although these ores can contain attractive non-ferrous metal values, they have not been successfully processed on a large commercial scale. This is due, partially to the relative abundance of the sulfide ores, partially to the fact that the non-ferrous metals are often associated with other material which render their extraction expensive, and partially because the present methods of concentrating sulfide ores have not been successfully adapted to include oxide type ores.

A number of processes have been proposed for the extraction of non-ferrous metal values from oxide ores. Historically, the oldest method of separating non-ferrous metal values from oxide ores is by smelting the mined ore or concentrates of it. However, the smelting process can result in the release of undesirable contaminants into the environment thus creating a serious air pollution problem.

Another process for removing non-ferrous metal values from ores is the method known as "cyanidation". The cyanidation process consists of leaching mined and crushed ore with dilute solutions of sodium cyanide and oxygen, thereby dissolving the metal as the complex cyanide ion, and then precipitating the metal by the addition of zinc or aluminum to the cyanide solution. Attempts to cyanide leach a non-ferrous metal, such as silver, from argentiferous oxide ores on a commercial scale can result in uneconomical metal recovery.

A third method of processing non-ferrous metal values from ores is chloride-volatilization. This process involves the isolation of non-ferrous metals from unwanted material by formation of metal chlorides with a suitable chloridizing agent and volatilization of these metal chlorides from the unwanted material. This process is not economically attractive, due to its high energy requirements.

It is therefore desired to develop a process for extracting non-ferrous metals from oxide ore. The method should provide a high percentage recovery of the desired metal values from low-grade oxide ore, while reducing the environmental impact and high energy cost associated with conventional procedures.

These and other advantages are achieved by the present process.

For the purposes of the specification, the term oxide ores refers to minerals which contain any amount of metal oxides, carbonates, silicates, or mixtures thereof. It can also include naturally occurring sulfide ores which have been converted to the oxide form by suitable treatment, such as heating. It will be understood that some oxide ores may contain only minor amounts of non-ferrous metal oxides, and may not be subject to economical recovery by the present process. It should also be understood that the non-ferrous metal recovered from oxide ores may initially be in a form other than as an oxide, carbonate, silicate, or mixture thereof. However, the non-ferrous metals will generally be dispersed throughout an "oxide" type mineral matrix.

SUMMARY OF THE INVENTION

The present invention is a process for extracting values of non-ferrous metals selected from the group consisting of silver, copper, lead, zinc, gold, nickel, magnesium, and chromium from an oxide ore. The process comprises leaching the ore with a solution containing at least one metal chloride salt selected from the group consisting of alkali metal chlorides and alkaline earth chlorides in the presence of an oxygen-containing gas at a temperature and pressure sufficient to solubilize the non-ferrous metal values into the solution of the metal chloride salt.

DESCRIPTION OF THE PREFERRED EMBODIMENT

The present invention is particularly concerned with the recovery of non-ferrous metal values of silver, copper, lead, zinc, gold, nickel, magnesium and chromium from oxide ore. The type of oxide ore to which the present invention is particularly adaptable is a dolomitic-based ore containing silver, copper, lead and zinc metals and a mixture of metal oxides and carbonates.

The dolomitic-based oxide ore, as mined, generally include hard and tough rock masses have the constituent minerals in intimate aggregation. The ore is crushed and ground by methods well-known to those skilled in the art to form particulates having a larger surface area per unit weight than initially mined ore.

Preferably, the ore is comminuted to form particulates characterized as having particles with their longest dimension less than about 149 microns (−100 Mesh, United States Standard Series). More preferably, the particles have their longest dimension less than about 74 microns (−200 mesh) and most preferably less than about 37 microns (−400 mesh). The size to which the ore is comminuted can be significant, since it has been observed that in the process of metal leaching the smaller the particle, the more completely and the more rapidly the non-ferrous metal values are converted to a soluble form by the leaching solution. It has been found practical and economical to crush and grind the mined ore until at least from about 80 to about 85 percent of it passes through a 100 mesh sieve. However, as indicated previously. more finely ground ore can advantageously be employed. Where longer treatment times and slower leaching rates can be tolerated, particles less than 100 mesh can be used within the scope of the present process.

The finely ground ore is leached by sluring the ore with a leaching solution containing at least one metal chloride salt. Preferably the leaching solution is an aqueous solution of at least one metal chloride salt. However, if desired, the leaching solution can contain polar solvents other than water. Such solvents should be suitable solvents for the metal chloride salt or salts employed and for the chloride salts of the non-ferrous metals leached.

Any alkali metal chloride salt, alkali earth chloride salt, or mixtures thereof soluble in the solvent, is suitable for use in the present process. However, the water-soluble chloride salts of lithium, sodium, potassium calcium, magnesium, and strontium are preferred. An aqueous leaching solution containing substantially only calcium chloride as the leaching agent is more preferred. Mixtures of metal chloride salts, as commonly found in chloride-type brines, are also suitable for use in the present process.

The ratio of the volume of the leaching solution to the volume of the solids is not critical provided that there is a sufficient amount of leaching solution to solubilize at least a portion, and preferably substantially all, of the leachable non-ferrous metal values.

A solution of the metal chloride salt having a concentration of from about 10 to about 70 percent by weight of the metal chloride is employed in the present process. Preferably, the solution has a concentration of about 25 to about 50% by weight of the metal chloride and most preferably, the solution has a concentration of from about 40 to about 45% by weight of the metal chloride. When more than one metal chloride salt is employed, the sum of the concentration of each component should be within the above-described ranges. Preferably, the solution of the metal chloride salt is an aqueous solution.

A slurry of ore and leaching solution is subjected to elevated temperatures and pressure, in a suitable reaction vessel which is capable of withstanding temperatures of at least about 250° C, pressures of at least about 1200 pounds per square inch gauge, as well as the corrosive atmosphere of the leaching solution under pressure.

An oxygen-containing gas under pressure, such as oxygen, air, or a mixture thereof, is metered into the reaction vessel to aid in the solubilization of the non-ferrous metal values into the leaching solution. Any oxygen-containing gas is suitable provided that the gas does not contain constituents which adversely interfere with the intended solubilization. The gas pressure within the reaction vessel can be any pressure above atmospheric pressure (0 psig). However, pressures of up to about 1200 psig are preferred. More preferably, the gas pressure is maintained in a range of from about 200 to about 600 psig. Pressures in excess of about 1200 psig do not appreciably increase the amount of non-ferrous metal values which may be solubilized, but can be utilized. Likewise, pressures below about 200 psig can be employed if longer reaction times can be tolerated.

The slurry of leaching solution and oxide ore is heated in the reaction vessel by any suitable means such as an electric heater, combustion furnace, or the like. Heat is applied to increase the temperature of the slurry to a temperature sufficient to solubilize at least a part, and preferably substantially all of the soluble non-ferrous metal values in the ore. It has been found that the amount of non-ferrous metal solubilized increases when the temperature of the contents of the reaction vessel is raised above room temperature (20° C) and is maintained in a range from about 60° C to about 250° C, and more preferably from about 125° C to about 225° C.

The selected temperature and pressure conditions are maintained for a sufficient time to allow at least a portion, and preferably substantially all of the soluble non-ferrous metal values contained in the ore to be removed by being solubilized in the metal chloride salt solution. Reaction times of from about $\frac{1}{4}$ to 12 hours are used, depending upon the other reacting conditions employed.

The ore and leaching solution are separated by suitable separation techniques, such as vacuum filtration. Preferably, the resulting solid filter cake of ore is contacted with additional leaching solution and finally with water to solubilize any residual non-ferrous metal values. The filtrate contains the solubilized non-ferrous metal values as the chloride salt of the elemental non-ferrous metal. If desired, the filtrate can be subsequently treated by methods well-known to those skilled in the art to recover the elemental non-ferrous metal values from solution. These methods include cementation, electrolysis, precipitation, or the like.

In one embodiment of the present invention wherein values of silver, copper, lead, and zinc are contained in a dolomitic-type oxide ore, the elemental non-ferrous metal values are recovered from the filtrate solution by the following cementation technique: (1) a sufficient amount of metallic copper is added to the solution to precipitate silver metal from the solution onto the metallic copper; (2) a sufficient amount of metallic lead is introduced into the solution to deposit elemental copper metal from the solution onto the lead; (3) the lead is recovered from solution by electrolysis; and (4) the zinc in solution is precipitated as the hydroxide. An appropriate hydroxide such as sodium hydroxide or calcium hydroxide is then added to precipitate the zinc from its hydroxide. The resulting chloride solution can then be recycled to the beginning of the extraction process.

The following examples illustrate the invention more specifically:

EXAMPLES

Dolomitic ore samples from Colorado were used in all the following examples. Elemental analysis of the non-ferrous metals in the ore by atomic absorption and X-ray fluorescence indicated 0.12–0.19 percent by weight silver, 0.34–0.43 percent by weight copper, 3.60–4.38 percent by weight lead, and 2.60 to 2.90 percent by weight zinc. X-ray diffraction indicated that the ore was largely composed of dolomite ($CaMg(CO_3)_2$) containing about 5 percent by weight $SiO_2$. The exact chemical form in which the silver, copper, lead and zinc are present was not known. Atomic Emission Spectroscopy indicated 16 percent by weight calcium, and neutron activation analysis indicated 42 percent by weight oxygen were present in the ore samples.

EXAMPLE 1

Physical characterization of the ore sample by screen analysis revealed that the ore, after grinding, was approximately one-third −400 mesh (United States Standard Series). As indicated in Table I, there was approximately 14% by volume of the ore that was +100 mesh, which was mostly $SiO_2$. The remainder of the particle size distribution is listed in Table I.

Table I

PHYSICAL CHARACTERIZATION OF DOLOMITIC ORE
Particle Size Distribution

| (U.S. Standard Mesh) Particle Size | Percentage (by volume) |
| --- | --- |
| +100 | 14 |
| −100 to +200 | 29.6 |
| −200 to +325 | 14.5 |
| −325 to +400 | 8.4 |
| −400 | 33.5 |

5.0429 Grams (g) of the ore were mixed together with 100 milliliters (ml) of 44.5 percent by weight $CaCl_2$ aqueous solution in a glass beaker. The beaker was placed in a 600 ml pressure reactor, which was then evacuated and pressurized with oxygen gas to 500 pounds psig. The slurry of ore and $CaCl_2$ solution was agitated within the reactor by use of a magnetic stirring bar. The reactor and the slurry were brought up to a temperature of 200° C. This temperature was maintained for 3 hours. After 3 hours, the reactor was cooled to room temperature in a water bath, depressurized and opened.

The ore was separated from the leaching solution by vacuum filtration. The solid filter cake of ore was washed with 25 ml of fresh $CaCl_2$ solution, and then with 50 ml of deionized water. The ore residue was dried and weighed. 4.4047 Grams of the solid residue was recovered.

The filtrate solution containing the extracted non-ferrous metals was treated with 200–250 ml of nitric acid to insure complete solution of the non-ferrous metals. The solution was made up to a volume of 500 ml by the addition of deionized water and then analyzed by Atomic Absorption Spectrophotometry for the non-ferrous metals of interest. Analysis indicated that 87 percent by weight of the available silver values contained in the ore was extracted into the solution.

EXAMPLES 2-35

Additional samples of ore were treated substantially according to the basic method described in Example 1. However, the metal salt, gas, pressure, temperature and time conditions were varied as outlined in Table II.

The brine referred to the Table II contained 47 percent by weight $CaCl_2$ 2.70 percent by weight KCl and 0.55 percent by weight NaCl (as determined by the American Society For Testing and Materials, Designation: E 449).

Where the present process was carried out at atmospheric pressure, no pressure reaction vessel was employed. In this situation the ore and leaching solution were mixed and heated in an open container on a magnetic hot plate stirrer. Gas was delivered into the mixture using a gas dispersion rod filter with a fritted disc or cylinder. The composition of the air employed in the present process contained about 78 percent by volume nitrogen and about 21 percent by volume oxygen.

Comparative Example A

A sample of the ore was treated substantially according to the basic method of Example 1, with the exception that the gas used was not an oxygen-containing gas. The result, which is not in accordance with the present invention is shown in Table II.

Table II clearly indicates that silver and other non-ferrous metal values, particularly lead, zinc, and copper can be successfully extracted from a dolomitic based ore using inorganic chloride salt solutions, particularly calcium chloride. The application of pressure, heat, and oxygen-containing gas to these solution extractions decreases the time required for removal of the metal values and increases the overall effectiveness of the solution extraction. The presence of oxygen either pure or in the form of air was beneficial in the extraction process.

Table II

| Example | Metal Salt | Aqueous Solution Concentration* (percent by weight) | Gas | Pressure (psig) | Temperature °C | Time (hrs) | % Metal Extracted |
| --- | --- | --- | --- | --- | --- | --- | --- |
| 1 | $CaCl_2$ | 44.5 | $O_2$ | 500 | 200 | 3 | 87 Ag |
| 2 | $CaCl_2$ | 44.5 | Air | 500 | 200 | 3 | 95 Ag |
| 3 | $CaCl_2$ | 44.5 | Air | 525 | 200 | 1½ | 94 Ag |
| 4 | $CaCl_2$ | 44.5 | Air | 550 | 200 | 1 | 90 Ag |
| 5 | $CaCl_2$ | 44.5 | Air | 600 | 200 | ½ | 91 Ag |
| 6 | $CaCl_2$ | 44.5 | Air | 600 | 200 | ½ | 88 Ag |
| 7 | $CaCl_2$ | 44.5 | Air | 750 | 200 | ½ | 95 Ag |
| 8 | $CaCl_2$ | 45.0 | Air | Atm | 100 | 71 | 77 Ag |
| 9 | $CaCl_2$ | 45.0 | Air | Atm | 100 | 24 | 30 Ag |
| 10 | $CaCl_2$ | 43.5 | $O_2$ | 300 | 200 | 4 | 90 Ag |
| 11 | $CaCl_2$ | 30 | Air | Atm | 65 | 2 | 17 Ag |
| 12 | $CaCl_2$ | 30 | Air | Atm | 65 | 12 | 78 Ag |
| 13 | $CaCl_2$ | 30 | Air | 525 | 200 | 4 | 86 Ag |
| 14 | $CaCl_2$ | 30 | Air | 790 | 200 | 4 | 99 Ag |
| 15 | $CaCl_2$ | 30 | Air | 950 | 200 | 4 | 97 Ag |
| 16 | $CaCl_2$ | 30 | Air | 1200 | 200 | 4 | 98 Ag |
| 17 | $CaCl_2$, KCl, NaCl } brine | 44.5 | Air | 525 | 200 | 1½ | 94 Ag |
| 18 | $CaCl_2$, KCl, NaCl } brine | 47 | $O_2$ | Atm | 60 | 24 | 38 Ag |
| 19 | $CaCl_2$, KCl, NaCl } brine | 47 | $O_2$ | Atm | 60 | 24 | 73 Ag (−400 mesh fraction only) |
| 20 | $CaCl_2$, KCl, NaCl } brine | 47 | Ar | 490 | 200 | ½ | 70 Ag |

Table II-continued

| Example | Metal Salt | Aqueous Solution Concentration* (percent by weight) | Gas | Pressure (psig) | Temperature °C | Time (hrs) | % Metal Extracted |
|---|---|---|---|---|---|---|---|
| 21 | CaCl$_2$ KCl NaCl }brine | 47 | Air | 490 | 200 | 1½ | 100 Ag |
| 22 | CaCl$_2$ KCl NaCl }brine | 47 | O$_2$ | 490 | 200 | 1½ | 100 Ag |
| 23 | CaCl$_2$ KCl NaCl }brine. | 47 | O$_2$ | 490 | 200 | ½ | 92 Ag |
| 24 | CaCl$_2$ KCl NaCl }brine | 47 | Air | 490 | 200 | 1½ | 66-Cu 92-Zn 98-Pb |
| 25 | CaCl$_2$ KCl NaCl }brine | 47 | Air | 490 | 200 | ½ | 60-Cu 91Zn 98-Pb |
| 26 | CaCl$_2$ KCl NaCl }brine | 47 | Air | 490 | 200 | 1½ | 100 Ag |
| 27 | CaCl$_2$ KCl NaCl }brine | 47 | O$_2$ | 480 | 200 | 1½ | 100 Ag |
| 28 | NaCl | 20 | Air | 570 | 200 | 2 | 76 Ag |
| 29 | NaCl | 20 | O$_2$ | 780 | 200 | 2 | 95 Ag |
| 30 | MgCl$_2$ | 36 | Air | 780 | 200 | 4 | 90 Ag |
| 31 | KCl | 26 | Air | 460 | 200 | 5 | 68 Ag |
| 32 | LiCl | 76 | Air | 500 | 200 | 7 | 90 Ag |
| 33 | BaCl | 27 | Air | 500 | 200 | 4 | 90 Ag |
| 34 | SrCl$_2$ | 33 | Air | 440 | 200 | 4 | 90 Ag |
| 35 | CaCl$_2$ | 30 | Air | Atm | 20 | 12 | 3 Ag |
| A | CaCl$_2$ KCl NaCl }brine | 47 | N$_2$ | 480 | 200 | 1½ | 33 Ag |

*The concentration of the aqueous solution of all brines used in the examples reflects the percentage by weight of CaCl$_2$ only.

What is claimed is:

1. A process for extracting values of non-ferrous metals selected from the group consisting of silver, copper, lead, zinc, gold, nickel, magnesium, and chromium from a dolomitic oxide ore comprising:
   leaching the ore with an aqueous solution consisting essentially of at least one metal chloride salt selected from the group consisting of alkali metal chlorides and alkaline earth chlorides in the presence of an oxygen-containing gas at a temperature of from about 125° C to about 225° C at a pressure of from about 200 to about 600 pounds per square inch gauge to solubilize the non-ferrous metal values into the aqueous solution of the metal chloride salt.

2. The process of claim 1 wherein the non-ferrous metal values are silver values.

3. The process of claim 1 wherein the metal chloride salt is calcium chloride.

4. The process of claim 1 wherein the solution of the metal chloride salt has a concentration of from about 10 to about 70 percent by weight of the metal chloride salt.

5. The process of claim 4 wherein the solution of the metal chloride salt has a concentration of from about 25 to about 50 percent by weight of the metal chloride salt.

6. The process of claim 5 wherein the solution of the metal chloride salt has a concentration of from about 40 to about 45 percent by weight of the metal chloride salt.

7. The process of claim 1 wherein the oxygen-containing gas is selected from the group consisting of air, oxygen and mixtures thereof.

8. The process of claim 1 wherein the ore is in the form of particulate characterized as having particles with their longest dimension less than about 149 microns.

9. The process of claim 8 wherein the ore is in the form of particulate characterized as having particles with their longest dimension less than about 37 microns.

10. The process of claim 1 including the subsequent step of recovering solubilized elemental non-ferrous metal values from the metal chloride salt solution.

11. A process for extracting silver values from argentiferous dolomitic oxide ore comprising:
   leaching the ore with an aqueous leach solution consisting of calcium chloride in the presence of an oxygen-containing gas at a temperature of from about 125° C to about 225° C at a pressure of from about 200 to 600 pounds per square inch gauge to solubilize the silver values into the leach solution.

* * * * *